United States Patent [19]

Matsuoka et al.

[11] Patent Number: 5,038,880
[45] Date of Patent: Aug. 13, 1991

[54] AUTOMATIC SPEED CONTROL SYSTEM FOR VEHICLE

[75] Inventors: Toshihiro Matsuoka, Higashi-Hiroshima; Kazutoshi Nobumoto, Aki; Kaoru Sotoyama, Hatsukaichi; Eiji Nishimura, Hiroshima, all of Japan

[73] Assignee: Mazda Motor Corporation, Hiroshima, Japan

[21] Appl. No.: 343,331

[22] Filed: Apr. 26, 1989

[30] Foreign Application Priority Data

Apr. 27, 1988 [JP] Japan .................... 63-104604

[51] Int. Cl.⁵ ............................ B60K 31/04
[52] U.S. Cl. .................... 180/179; 180/170; 364/426.04
[58] Field of Search ............ 180/170, 178, 179; 364/426.04

[56] References Cited

U.S. PATENT DOCUMENTS 4,845,621  7/1989  Kawata et al. .......... 364/426.04

FOREIGN PATENT DOCUMENTS 61-24621    2/1986  Japan .................. 180/178
61-238521  10/1986  Japan .................. 180/170
62-152926   7/1987  Japan .................. 180/178
63-2740     1/1988  Japan .................. 180/170
63-49530    3/1988  Japan .................. 180/170

*Primary Examiner*—Andres Kashnikow
*Assistant Examiner*—Eric Culbreth
*Attorney, Agent, or Firm*—Fleit, Jacobson, Cohn, Price, Holman & Stern

[57] ABSTRACT

An automatic speed control system for a vehicle includes an automatic transmission, a speed change switch for producing signals for changing a vehicle speed, and a shift down control device. The shift down control device carries out a shift down operation of the automatic transmission of the vehicle under a certain vehicle driving condition when the shift down control device receives the signals from the speed change switch. A gradient detecting device detects a gradient of a running path on which the vehicle is driven, and shift down prohibiting device prohibits the shift down operation even where the speed change switch is actuated to the vehicle speed at least when the gradient of a running path detected is greater than a predetermined value so that unnecessary shift changes are suppressed.

9 Claims, 9 Drawing Sheets

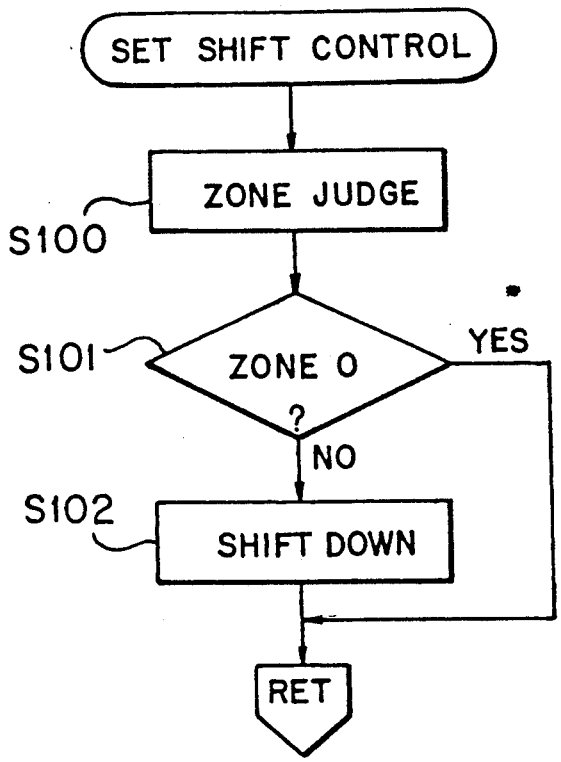
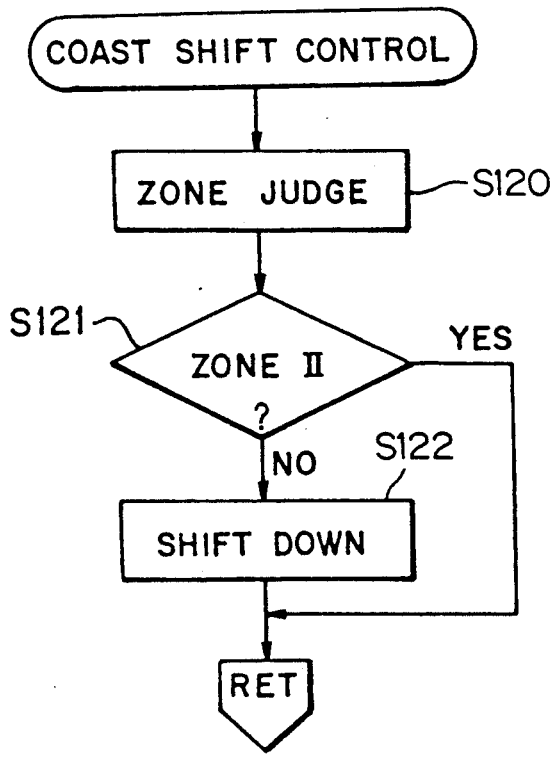

AUTOMATIC SPEED CONTROL SYSTEM FOR VEHICLE

CROSS REFERENCE TO RELATED APPLICATIONS

This application relates to copending U.S. Patent application Nos. 263,416 filed on Oct. 27, 1988 entitled "CONSTANT-SPEED CRUISING CONTROL SYSTEM" now Pat. No. 4,933,859 and 282,214 filed on Dec. 9, 1988 entitled "CONSTANT-SPEED CRUISING CONTROL SYSTEM" now continuing application Ser. No. 563,827, which are assigned to the same assignee as the present application.

BACKGROUND OF THE INVENTION

1. Field of the Invention

The present invention relates to an automatic speed control system for vehicle, and more particularly to a so called autocruising system in which a vehicle speed is maintained at a substantially constant value.

2. Description of the Prior Art

There has been known a vehicle which is controlled to run at a predetermined constant speed based on a difference between an actual vehicle speed and a target vehicle speed as shown by Japanese Patent Public Disclosure No. 59-192114, laid open to the public in 1984. In this type of vehicle speed control system, when the difference between the actual speed and the target speed is in a predetermined range, a shift up operation of a transmission is made for improving the fuel consumption efficiency. On the other hand, when the difference between the actual speed and the target speed is out of the predetermined range, a shift down operation is made for acceleration and deceleration.

The target vehicle speed can be reset when a driver of the vehicle desires more speed or less speed of the vehicle by using a set switch and a coast switch as shown by Japanese Patent Public Disclosure Nos. 61-238518 and 61-238515, laid open to the public in 1986.

U.S. Pat. Nos. 4,697,478 and 4,709,595 disclose conventional transmissions, which are assigned the same assignee as the present application.

It should be noted that it is not necessary to make a shift down operation of the transmission when the set switch and the coast switch are actuated for acceleration and deceleration. Unnecessary shift down operation causes a shift shock and causes riding comfort as well as the durability of the vehicle to deteriorate.

When the vehicle runs on a downwardly sloped path, it is not necessary to make a shift down operation even where the set switch is actuated for more speed. Moreover, when the vehicle runs on an upwardly sloped path, it is not necessary to make a shift down operation even where the coast switch is actuated for less speed.

Under such operating conditions, the shift down operation causes a hunting shift operation, based on repetitions of the shift down and up operations.

SUMMARY OF THE INVENTION

It is therefore a primary object of the present invention to provide an automatic speed control system in which shift down operations are kept to suppressed as small a number as possible when a target speed of the vehicle toward which the vehicle speed is controlled is changed.

It is another object of the invention to provide an automatic speed control system by which shift down operations of the vehicle are kept to as small a number as possible when the set switch is actuated to increase the vehicle speed to obtain an improved riding comfort.

It is still another object of the invention to provide an automatic speed control system which shift down operations of the vehicle are kept to as small a number as possible when the coast switch is actuated to decrease the vehicle speed to obtain an improved riding comfort.

According to the present invention, the above and other objects and features of the invention can be accomplished by an automatic speed control system for a vehicle comprising an automatic transmission provided with a plurality of shift gear stages, speed change switch means for producing signals for changing a vehicle speed, shift down control means for carrying out a shift down operation of the automatic transmission of the vehicle under a certain vehicle driving condition when the shift down control means receives the signals from the speed change switch means, wherein the improvement comprises gradient detecting means for detecting a gradient of a running path on which the vehicle is driven, and shift down prohibiting means for prohibiting the shift down operation even the speed change switch means is actuated for changing the vehicle speed at least when the gradient of a running path detected is greater than a predetermined value.

In a preferred embodiment of the present invention the automatic speed control system is provided with acceleration switch means for producing signals for accelerating the vehicle. When a gradient of a down slope running path greater than a predetermined value is detected, a shift down operation is prohibited even when the acceleration switch means is actuated for acceleration.

In another preferred embodiment of the present invention, the automatic speed control system is provided with deceleration switch means for producing signals for decelerating the vehicle. When a gradient of an up hill running path greater than a predetermined value is detected, a shift down operation is prohibited even when the deceleration switch means is actuated for deceleration.

This is because the target speed can be accomplished without shift down operation under such vehicle operating conditions. As a result, the riding comfort as well as the durability of the vehicle can be improved.

The gradient of the running path is detected based on a map indicating a relationship between the vehicle speed and an engine load which varies depending on the gradient of the running path.

A shift up operation of the automatic transmission is suppressed when the engine load is greater than a predetermined value in the case where a shift down operation has been carried out in accordance with an actuation of the acceleration switch means and thereafter the acceleration switch means has been turned off. The engine load can be obtained by detecting a throttle valve opening, an amount of intake gas and the like.

A shift up operation of the automatic transmission is suppressed when the engine load is smaller than a predetermined value in the case where a shift down operation has been carried out in accordance with an actuation of the deceleration switch means and thereafter the deceleration switch means has been turned off.

The above and other objects and features of the present invention will be apparent from the following description and by taking reference with accompanying drawings illustrating a preferred embodiment of the present invention.

BRIEF DESCRIPTION OF THE DRAWINGS

FIG. 2 through FIG. 6, FIG. 8 and FIG. 9 are flow charts of a control for the automatic vehicle speed control system utilizing a control unit;

DESCRIPTION OF PREFERRED EMBODIMENTS

Figure 1:
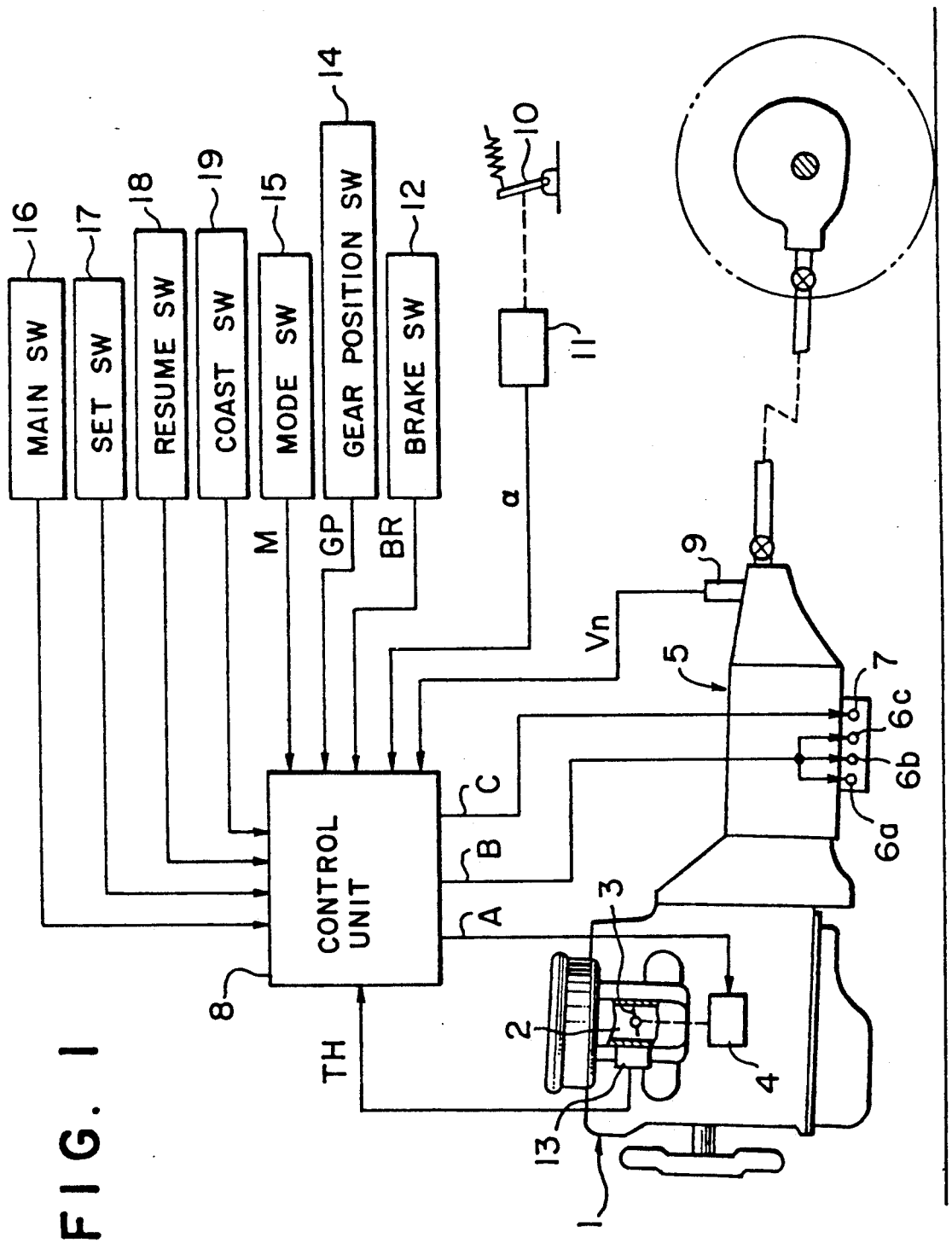
FIG. 1 is a schematic view of an engine provided with an automatic vehicle speed control system in accordance with the present invention.

Referring to the drawings, and specifically to FIG. 1, there is shown a schematic view of an engine provided with an automatic speed control system or automatic cruising system in accordance with the present invention.

An engine 1 is connected with an intake passage 2 in which a throttle valve 3 is provided for controlling the intake of air. The throttle valve 3 is controlled by an actuator 4, such as a DC motor 4, which changes the openings thereof.

An automatic transmission 5 is provided with a plurality of shift solenoids 6a, 6b and 6c for actuating hydraulic elements (not shown) to switch a hydraulic circuit attached to the transmission 5 and thereby establish one shift gear stage from among a plurality of shift gear stages. There is provided a lock up solenoid 7 for controlling engagement of a lock up clutch (not shown).

There is further provided a control unit 8 for controlling the transmission 5. The control unit 8 receives a vehicle speed signal Vn from a vehicle speed sensor 9, an accelerator stroke signal α from an acceleration sensor 11, a brake signal BR from a brake switch 12, a throttle opening signal TH from a throttle valve opening sensor 13, a gear position signal GP from a gear position sensor 14 for detecting a shift gear position of the transmission 5, and a shift mode signal M from a mode switch 15 for detecting a shift mode currently selected. The control unit 8 produces a throttle valve control signal A, a shift control signal B and a lock up control signal to the throttle valve actuator 4, the shift solenoids 6a, 6b and 6c and the lock up control solenoid 7. The control unit 8 also receives signals from a main switch 16, a set switch 17, a resume switch 18 and a coast switch 19 which together constitute the automatic cruising system.

Hereinafter an automatic speed control (hereinafter referred to as ASC) in accordance with a preferred embodiment of the present invention is described. Reference should be made to FIGS. 2 through 9.

Figure 2:
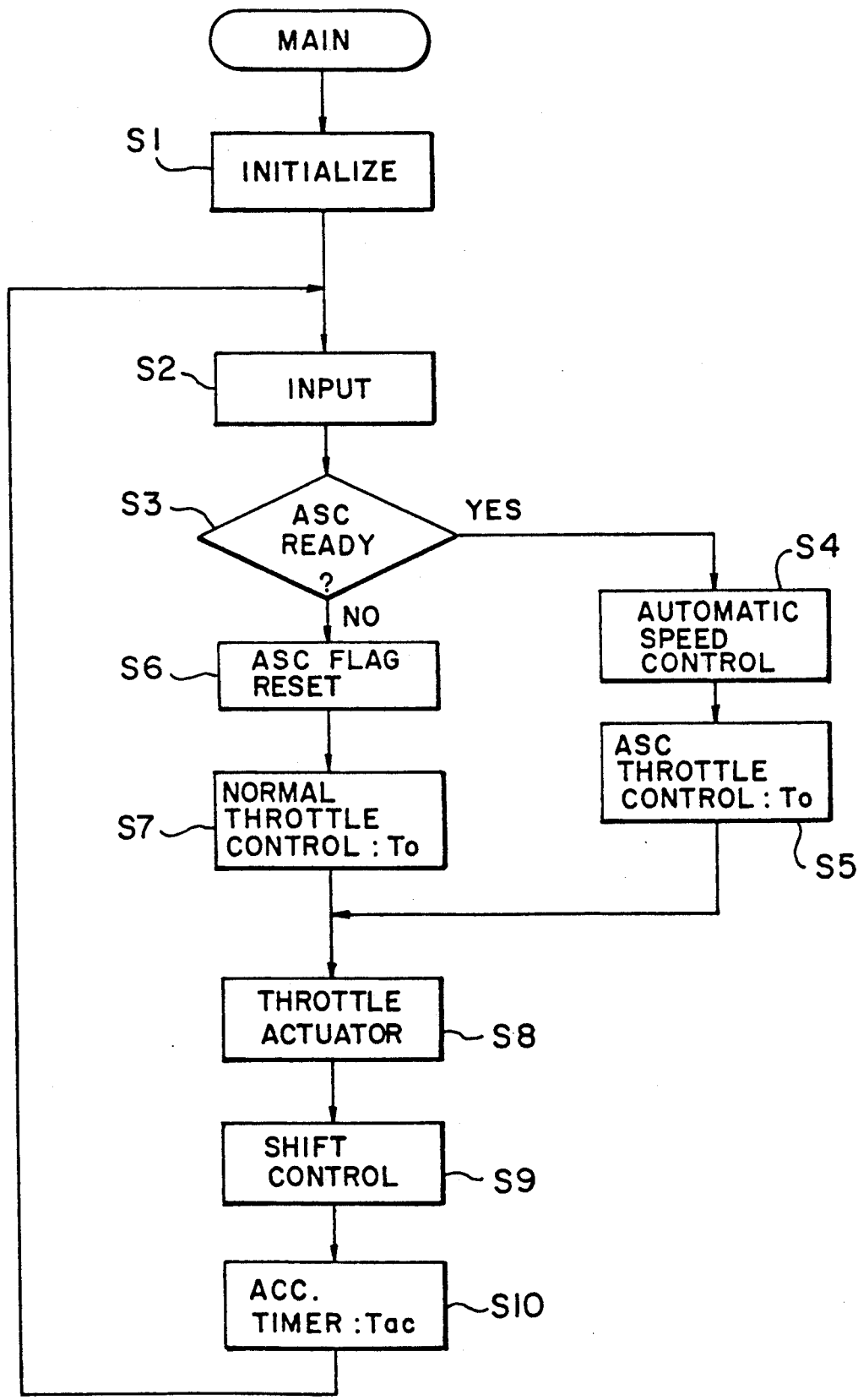

Referring to FIG. 2, there is shown a flow chart of a main routine of the ASC.

The control unit 8 initializes the system (S1 and reads signals from the various sensors (S2).

In the next step, the control unit 8 determines whether or not the ASC is ready to be carried out in light of a vehicle operating condition (S3). In a case in which the main switch 16 is turned on, and the vehicle speed is more than a predetermined value such as 40 km/h, the control unit 8 judges that the ASC is ready to be carried out. If one the above conditions is not satisfied, the control unit 8 judges that the ASC is not ready. Further, when the brake is actuated, even where both the above conditions are satisfied, the control unit 8 judges that the condition for the ASC is released.

When it is judged that the condition for the ASC is satisfied, the ASC is carried out so that a target throttle value opening T0 is determined (S5) in accordance with operations of the set switch 17, resume switch 18, coast switch 19, accelerator pedal 10, braking operation, and operating mode such as a vehicle speed feedback control mode and an acceleration mode.

In step S3, if the condition for the ASC is not satisfied, the control unit 8 resets various flags for the ASC (S6). Then, the control unit 8 determines the target throttle valve opening T0 based on the accelerator stroke (S7).

The control unit 8 produces the throttle valve control signal A corresponding to the target value T0 to the throttle valve actuator 4 (S8) so as to control the opening of the throttle valve 3 and change it toward the target value T0. The control unit 8 also produces shift control signals B and C for the shift solenoid 6a, 6b and 6c, and the lock up solenoid 7 based on the vehicle speed Vn, throttle opening TH, and acceleration stroke α(S9). In the next step, the control unit 8 counts up an acceleration timer Tac (S10). This routine is repeated at certain intervals.

Figure 3:
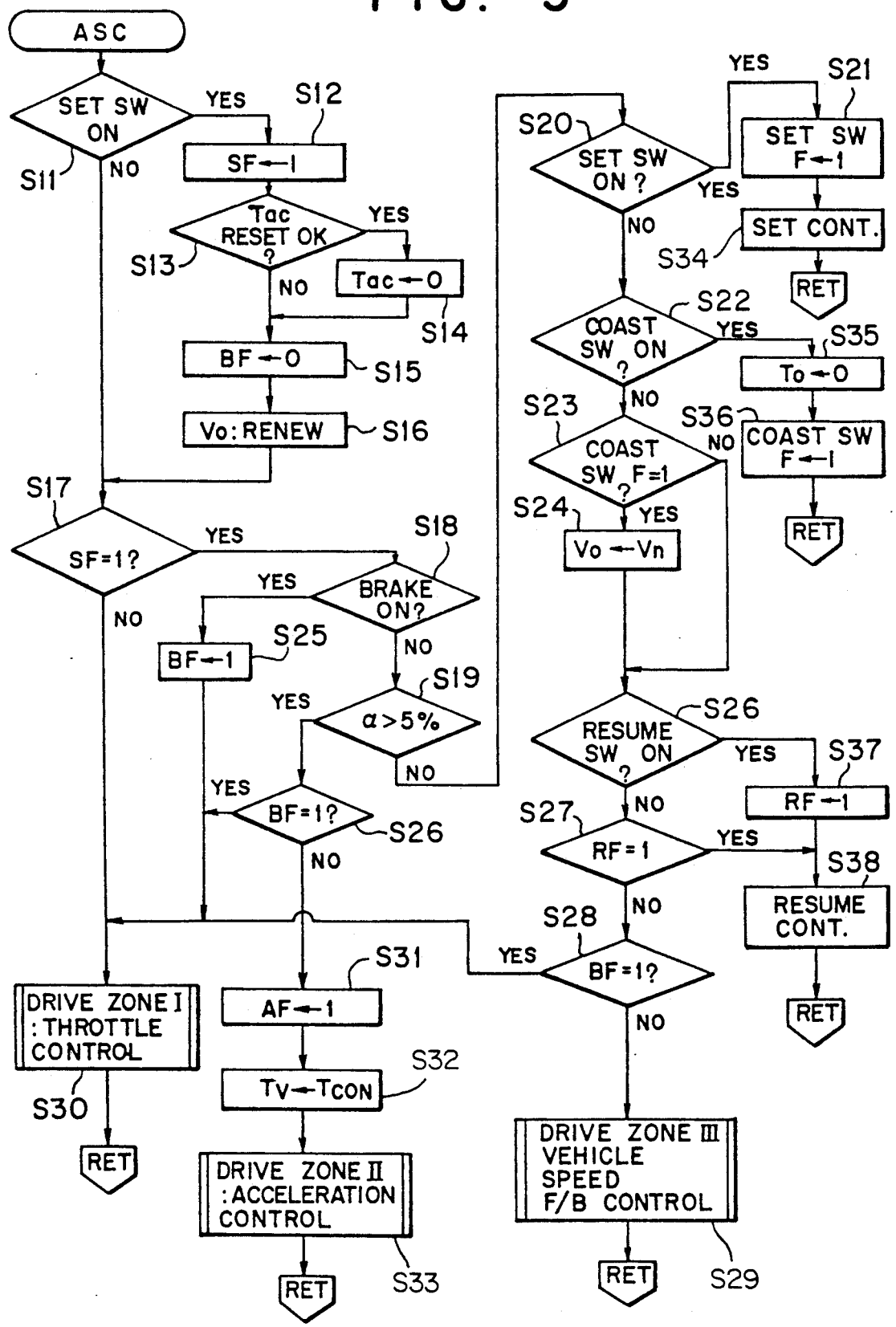

Referring to FIG. 3, there is shown a flow chart of a mode set subroutine program for the ASC of step S4 in the flow chart of FIG. 2. In the ASC, it is judged whether or not the set switch 17 is on (S11). If this judgment is yes, an actuation flag SF is set (S12) at 1. Then, the control unit 8 judges whether or not a target vehicle speed Vo has been set previously (S13). For instance, when a braking operation is made after the target vehicle speed Vo is set once by operating the set switch 17, the ASC is released. In this case, the acceleration timer Tac is reset at a value of zero (S14). Where the timer Tac is reset, the braking operation must have been terminated so that a braking operation release flag BF is reset at a value of zero (S15). When the set switch is kept on, the value of the target vehicle speed is renewed continuously. When the set switch 17 is turned off, a final target vehicle speed can be obtained as a value of Vo (S16).

The control unit 8 then judges whether or not the ASC is being carried out based on the value of the actuation SF (S17).

In the case where the ASC is being carried out, when a braking operation or an acceleration operation does not occur and the set switch 17, the resume switch 18 and the coast switch are not actuated, the control unit 8 carries out a constant vehicle speed control or selects a vehicle speed feedback control mode III (S20-S29).

In this process, the control unit 8 judges whether or not the set switch 17 is set on. If the judgment is yes, the control unit 8 sets a set switch flag at 1 (S21). The control unit 8 judges whether or not a coast switch flag has been set at 1 (S23) in the case where the set switch 17 is off. If this judgment is yes, the control unit 8 provides as the target vehicle speed Vo the actual vehicle speed Vn (S24). If the judgment in step S23 is no, the control unit 8 skips the step S24.

When the judgment in step S26 as to whether or not the resume switch 18 is on is no, the control unit 8 further judges whether or not a resume switch flag is set to 1. If this judgment is no, the control unit 8 further judges whether or not brake release flag BF is set at 1. If this judgment is no, the control unit 8 carries out a vehicle speed feedback control as a result of selection of the mode III (S29).

During the vehicle speed feedback control of the step S29, when the braking operation occurs, the control is switched to the throttle valve opening control as selected control mode I (S30).

Under the control mode I, a base throttle opening Tb is determined, based on the detected accelerator stroke α and in correspondence with a shift mode currently selected from among a plurality of modes such as an economy mode, a normal mode and a power mode. The base throttle opening Tb is compensated in accordance with a change speed in the accelerator stroke, the vehicle speed, engine coolant temperature and the like to obtain the target throttle valve opening T0.

During the constant vehicle speed control, or control mode III, in step 29, when the accelerator stroke increases beyond a predetermined value α0 (in this example α0 is 5%), an acceleration flag AF is set at 1 (S31). Then the target throttle valve opening Tv is determined as a normal running throttle opening Tcon which is provided in response to the vehicle speed Vn when the vehicle runs on a substantially flat path (S32). Eventually, an acceleration mode II is selected to be carried out (S33).

During the vehicle speed feedback control, when the set switch is actuated for acceleration, the control unit 8 carries out a set control for increasing the vehicle speed (S34). For this purpose, the control unit 8, first of all, judges whether or not the acceleration timer Tac is over. If the judgment is yes, the control unit 8 sets a shift flag and selects the acceleration mode II for shift down operation. In this control mode, an opening compensation Tdis is determined, based on a difference between the target throttle valve opening Tv and the normal running throttle opening Tcon corresponding the actual vehicle speed Vn currently detected. An acceleration throttle opening Tres which provides a constant acceleration of the vehicle when running on a flat path is taken into account. The target throttle valve opening T0 is determined so as to cause the vehicle to be accelerated at a constant rate.

If the timer Tac is not over, the control is switched to the vehicle speed control mode III for prohibiting the shift down operation.

During the vehicle speed feedback control, if the coast switch 19 is turned on, the control unit 8 carries out a coast control for decreasing the vehicle speed. In this procedure, the control unit 8 provides the target throttle opening T0 with opening value of zero to fully close the throttle valve 3 (S35). When the coast switch 19 is turned off, the control unit 8 provides the target vehicle speed Vn with the actual vehicle speed at the time of turning the switch 19 off and sets the coast switch flag at 1 (S36).

Further during the vehicle speed feedback control, when the resume switch 18 is turned on to reset the target vehicle speed Vo to the previous value in the case where the ASC is released because of a braking operation, the control unit 8 sets the resume flag at 1 for carrying out a resume control (S37, S38). In the resume control, the control unit 8 resets the resume flag at zero when the difference between the target vehicle speed Vo and the actual vehicle speed Vn is smaller than a predetermined value, and selects the feedback control mode III.

On the other hand, when the difference between the target vehicle speed Vo and the actual vehicle speed value is greater than a predetermined value, the control unit 8 carries out the acceleration control as aforementioned in connection with step 34 wherein the target throttle valve opening T0 is determined so as to accelerate the vehicle so that it reaches the target vehicle speed Vo.

Figure 4:
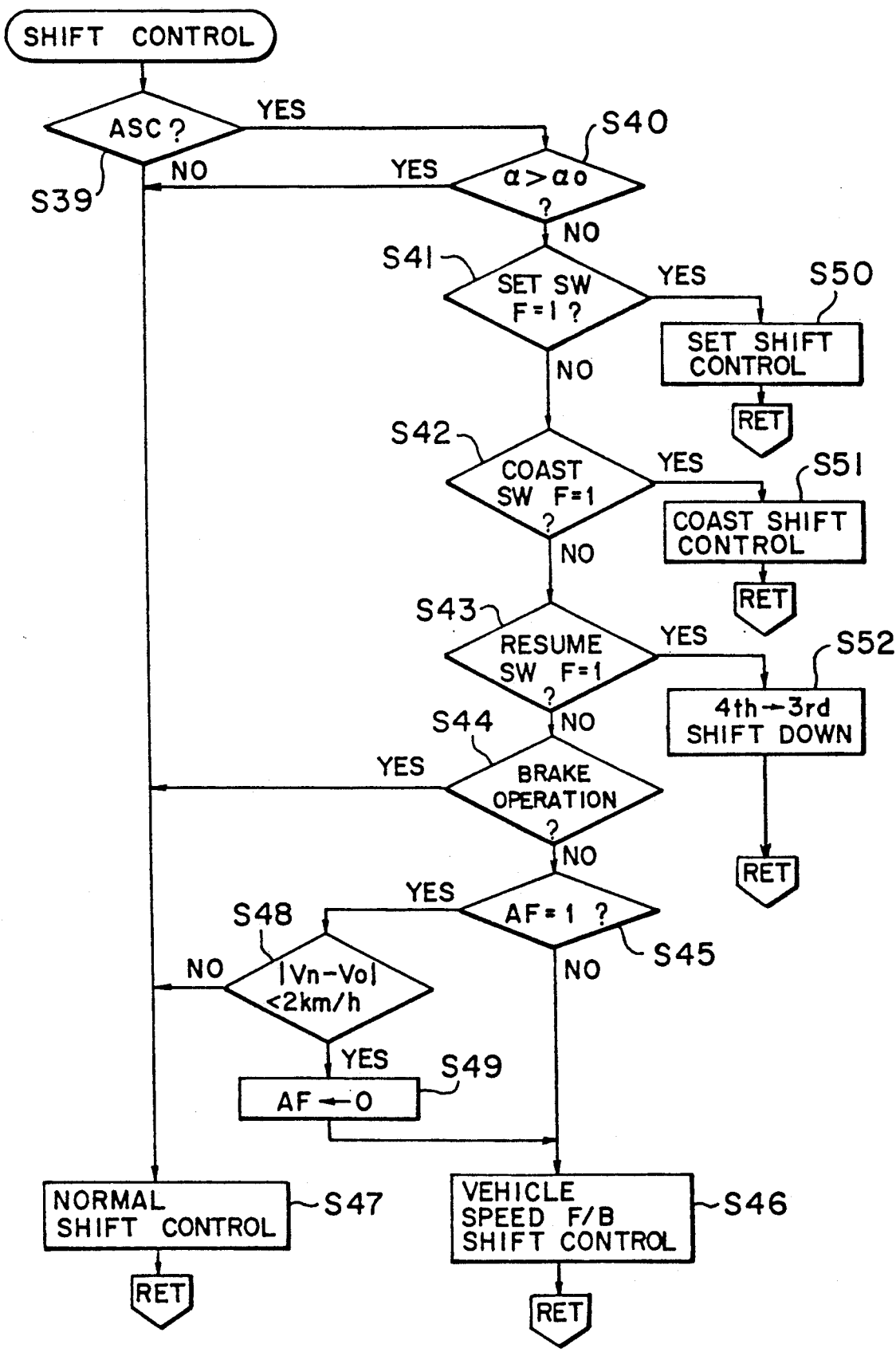

FIG. 4 is a flow chart of the shift control shown by the step S9 of the main program in FIG. 2.

The control unit 8 judges whether or not the vehicle is in a ASC (S39). In the case where the judgment is yes, when the control unit 8 finds that the accelerator stroke α is not greater than the predetermined value α0 (S40), that the set switch is not turned on (S41), that the coast switch is not turned on (S42), that the resume switch is not turned on (S43), that the vehicle is not in a braking condition (S44), and that the vehicle is not in an accelerating condition (S45), a shift control based on the vehicle speed feedback control is carried out (S46).

When the accelerator pedal is operated to increase its stroke beyond the predetermined value α0 (S40) during the ASC, a normal shift control is carried out (S47). The normal shift control is executed based on a shift pattern defined by the actual vehicle speed Vn and the accelerator stroke α.

When the vehicle is in a braking condition (S44) during the ASC, the normal shift control is also carried out. Likewise, when the vehicle is in an accelerating condition and the vehicle speed moves beyond a predetermined difference between the actual vehicle speed Vn and the target vehicle speed Vo such as 2 km/h (S48), or alternatively when the ASC is not executed (S39), the normal shift control is activated.

In step S48, when the difference between the actual vehicle speed Vn and the target vehicle speed Vo is smaller than the predetermined value, the control unit carries out the vehicle speed feedback control (S46) after resetting the accelerating flag Af to zero (S49).

When the set switch 17 is turned on for increasing the vehicle speed during the vehicle speed feedback control (S41), a set shift control is carried out (S50).

When the coast switch 19 is turned on (S42) for decreasing the vehicle speed during the vehicle speed feedback control, a coast shift control is carried out (S51).

when the resume switch 18 is turned on (S43) for restoring the previous target vehicle speed after a braking operation, a resume shift control is carried out wherein a shift down operation is made, for instance, from a fourth stage to a third stage for establishing an accelerating condition of the vehicle (S52).

Figure 6:
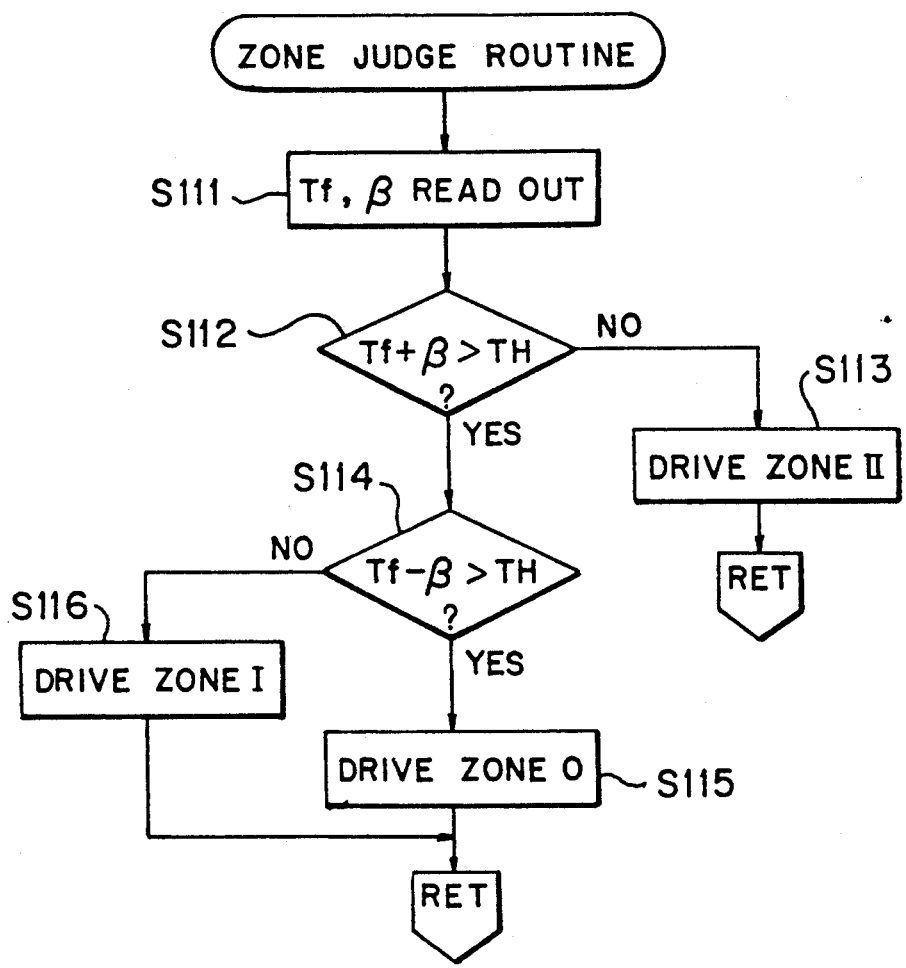
Figure 7:
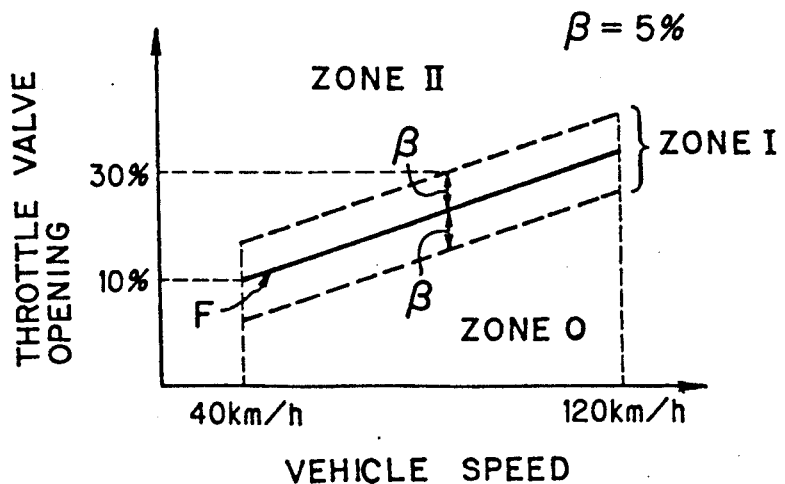
FIG. 7 is a map for judging a driving zone which employed for the control.

In FIG. 5, there is shown a flow chart of the set shift control. The control unit 8 finds a driving zone of the vehicle and determines whether the vehicle is in an ascent running condition, a flat running condition or a descent running condition (S100). In FIG. 6, there is shown a flow chart of a subroutine program for judging the driving zone. In FIG. 7, there is provided a driving zone judgment map obtained through a test and stored in the control unit 8. The driving zone is judged based on this map. In FIG. 7, a line F shows a relationship between the throttle valve opening and the vehicle speed when the vehicle runs on a flat path normally. When a throttle valve opening corresponding to a vehicle speed is in a zone above the line F in FIG. 7, this means that more engine power is needed for obtaining the same vehicle speed as that of the flat running condition. It will be therefore understood that the vehicle is in an ascent running condition (driving zone II).

On the other hand, when a throttle valve opening corresponding to a vehicle speed is in a zone below the line F in FIG. 7, it is found that the vehicle is in a descent running condition (driving zone 0), since it is considered that less engine power can provide the same vehicle speed as that in the flat running condition. Thus, the driving zone judgment can be basically accomplished by judging whether or not a throttle valve opening corresponding to a vehicle speed falls above the line F in FIG. 7. It should however be noted that there is introduced a compensation value $\beta$ for defining a dead zone (driving zone I corresponding to the flat running condition) against the driving zone II and driving zone 0. This driving zone I is effected to prevent the shift control from hunting. As the compensation value $\beta$ is increased, a gradient of a path on which the vehicle is running is increased before the control unit 8 holds, or determines that the vehicle driving condition is in the driving zone II or 0. Therefore, large compensation value $\beta$ reduces a changes across the driving zones to provide a stable shift control On the other hand, a small compensation value $\beta$ provides a responsive shift control. Preferably, the value $\beta$ is determined based on a test result.

In the set shift control, the control unit 8 reads out a throttle valve opening Tf corresponding to the flat running condition and the compensation value $\beta$ in accordance with the vehicle speed Vn from the speed sensor 9 in light of the map of FIG. 7 (S111) as shown sin FIG. 6. Thereafter the control unit 8 judges whether or not the throttle valve opening signal TH obtained from the throttle valve sensor 13 is smaller than a sum of the throttle valve Tf and the value $\beta$, i.e., $Tf+\beta>TH$ (S112) as shown in FIG. 6.

If the judgment is no, it is determined that the driving zone is the driving zone II, or an ascent driving zone (S113).

If the judgment is yes, the control unit 8 further judges whether or not $Tf-\beta>TH$ (S114). If the judgment in step S114 is yes it is determined that the driving condition is in the driving zone 0, or a descent driving zone (S115). On the other hand, if the judgment in step S115 is no, it is determined that the driving zone is the driving zone I, or a flat driving zone (S116).

In the set shift control shown in FIG. 5, the control unit 8 judges whether or not the driving zone is, or the vehicle is running on a descending path through the above procedure (S101).

If the judgment in S101 is yes, there is no need to make a shift down operation even when the set switch 17 is on since the vehicle is running on a descending path.

When the judgment in S101 is no, which means that the vehicle is running on an ascending or flat path, a shift down operation is made in order to get more driving force (S102).

FIG. 8 shows a flow chart of a subroutine program of the coast shift control. In FIG. 8, the control unit 8 judges the driving zone with regard to the current condition in accordance with the procedure as aforementioned, referring to FIG. 6 (S120). then the control unit 8 judges whether or not the vehicle is in the ascent running zone II (S121). If the judgment in step S121 is yes, a shift down operation is not made even when the coast switch is on because the vehicle is in an ascending condition. On the other hand, if the judgment in step S121 is no, a shift down operation is made for decreasing the vehicle speed (S122) because the vehicle is in a descent or flat running condition.

Figure 9:
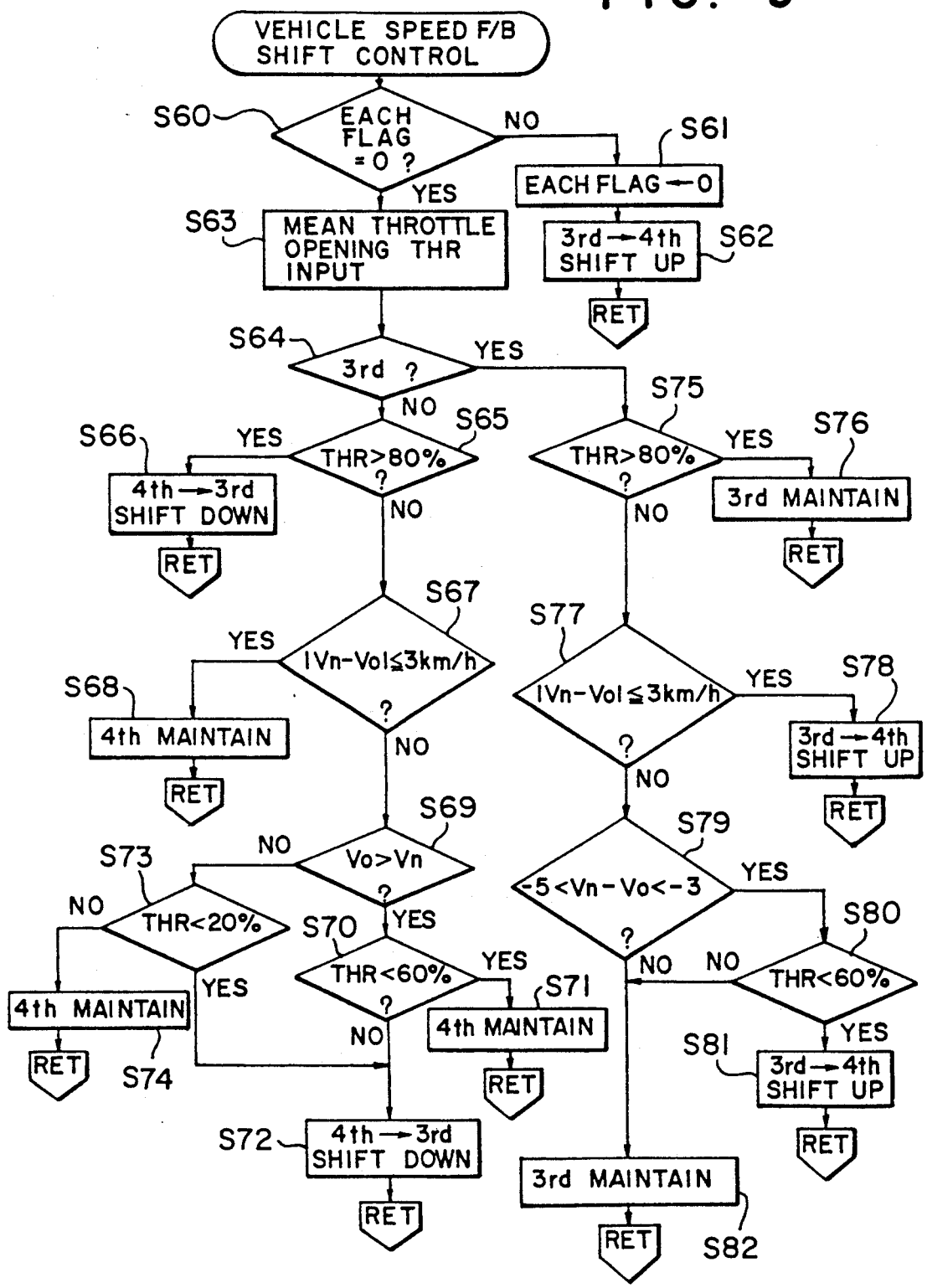

FIG. 9 shows a flow chart of a program for the vehicle speed feedback control of step 46 in FIG. 4.

In FIG. 9, the control unit 8 judges whether or not each of the switch flags is reset at 0 (S60). the switch flag is set at 1 in the set shift control, in the coast shift control and in the resume shift control. When the shift controls finish and the control is transferred to the vehicle speed feedback control, the switch flag is reset at 0 (S61) in FIG. 9.

Next, the control unit 8 makes a shift up operation, for instance from the third stage to the fourth stage (S62). This is because a shift down operation has been made for acceleration and deceleration during the shift controls for controlling the vehicle speed.

If the judgment in step 60 is yes, the control unit 8 calculates a mean value THR of the throttle opening which is obtained by taking an average of several values of previous throttle openings TH. The mean value THR is employed for suppressing an influence of fluctuation of the throttle opening TH.

In step S64, the control unit 8 judges whether or not the shift gear position is the third position If this judgment is no, the shift gear position is considered to be in the fourth position since the illustrated control example is applied to a shift change between the fourth and third positions.

If the shift gear stage is in fourth gear position, the control unit 8 judges whether or not the mean throttle valve opening TH is more than a first predetermined opening rate such as 80% (S65) so as to judge whether or not the engine can afford to produce enough power without making a shift down operation. If this judgment is yes, this means that the engine can not afford to produce the enough power without making shift down operation. Thus, in this case, the control unit 8 carries out the shift down operation from the fourth position to the third position.

If the judgment in step S65 is no, the control unit 8 further judges whether or not the speed difference between the actual vehicle speed Vn and the target vehicle speed Vo is smaller than a predetermined value (3km/h in this embodiment) (S67). If this judgment is yes, this means that the engine can afford to produce enough driving force to produce the target vehicle speed without any shift down operation. Thus, in this case, the control unit 8 maintains the fourth gear position (S68). In step S67, when the judgment is no, the control unit 8 further judges whether or not the actual vehicle speed Vn is smaller than the target vehicle speed Vo (S69). When the judgment is yes in step S69, this means that the vehicle is decreasing in speed, or running on an ascending path. In this case, the control unit 8 further judges whether or not the mean throttle opening THR is smaller than a second predetermined rate (for example 60%) (S70). If this judgment is yes, this means that the engine can afford to produce enough power to produce the target vehicle speed without any shift down operation. Therefore, the control unit 8 maintains the fourth gear position (S71). If the judgment in step S70 is no, this means that the engine cannot afford to provide the vehicle with enough power to get the target value of the vehicle speed Vo without a shift down operation. Therefore, the control unit 8 makes a shift down operation from the fourth to the third gear position.

In step S69, if the judgment is no, this means that the vehicle is increasing its speed, or running on a descending path. In this case, the control unit 8 further judges whether or not the mean throttle opening THR is smaller than a third predetermined opening rate (for example 20%) (S73). If the judgment in step S73 is no, this means that the engine can afford to produce enough of an engine braking effect without any shift down operation so that the control unit 8 maintains the fourth gear position (S74). If the judgment in step S73 is yes, this means that engine cannot produce the enough of a braking effect to reduce the vehicle speed Vn to thereby produced the target value Vo without any shift down operation of the transmission. Therefore, the control unit 8 carries out a shift down operation to get more of a braking effect (S72).

In step S64, when the shift gear stage is in the third gear position, the control unit 8 in turn judges whether or not the mean throttle valve opening THR is more than a first predetermined percentage (in this embodiment 80%)(S75). If the judgment is yes, this means that the engine cannot afford to produce enough power if a shift up operation is made. Therefore the control unit 8 maintains the third gear position (S76).

If the judgment in step S75 is no, the control unit 8 further judges whether or not the speed difference between the actual vehicle speed Vn and the target vehicle speed Vo is smaller than a predetermined value such as 3 km/h (S77). If this judgment is yes, this means that the vehicle speed Vn is approach the target value Vo. In this case, the control unit 8 is caused to make a shift up operation from the third gear position to fourth gear position for improving a fuel consumption efficiency (S78). If the judgment in step S77 is no, the control unit 8 further judges whether or not the target speed Vo is greater than the actual speed Vn by 3-5 km/h (S79). If this judgment is yes, the control unit 8 further judges whether or not the mean throttle valve opening THR is smaller than a second predetermined rate (in this embodiment 60%) (S80). If the judgment is yes, it is considered that the engine can afford to produce an enough power even if a shift up operation is made from the third position to the fourth position. Therefore, the control unit 8 is caused to make a shift up operation (S81) in this condition.

On the other hand, if the judgment in step S80 is no, the control unit 8 maintains the third gear position (S82). This is because the throttle opening is relatively large so that it is considered difficult for the engine to exert sufficient power to accomplish a target speed value by controlling only the throttle opening if the shift up operation is made.

A gradient sensor can be employed for detecting the gradient of the running path of the vehicle in lieu of the map of the relationship between the throttle valve opening and the vehicle speed.

Figure 10:
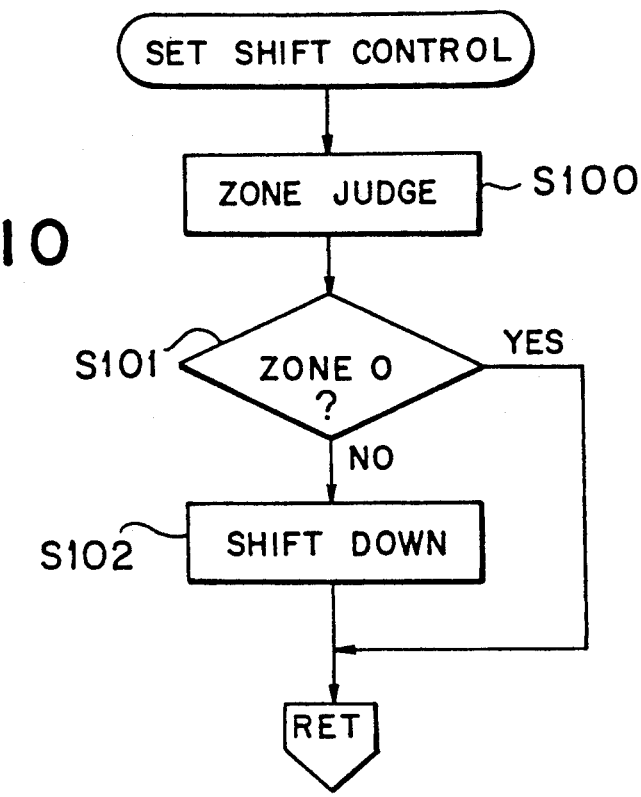
FIGS. 10 through 12 are flow charts corresponding to FIG. 5, FIG. 8 and FIG. 9, but illustrating another embodiment in accordance with the present invention.

Hereinafter, another preferred embodiment in accordance with the present invention is described. Reference to FIG. 10 should be made through FIG. 12.

Figure 11:
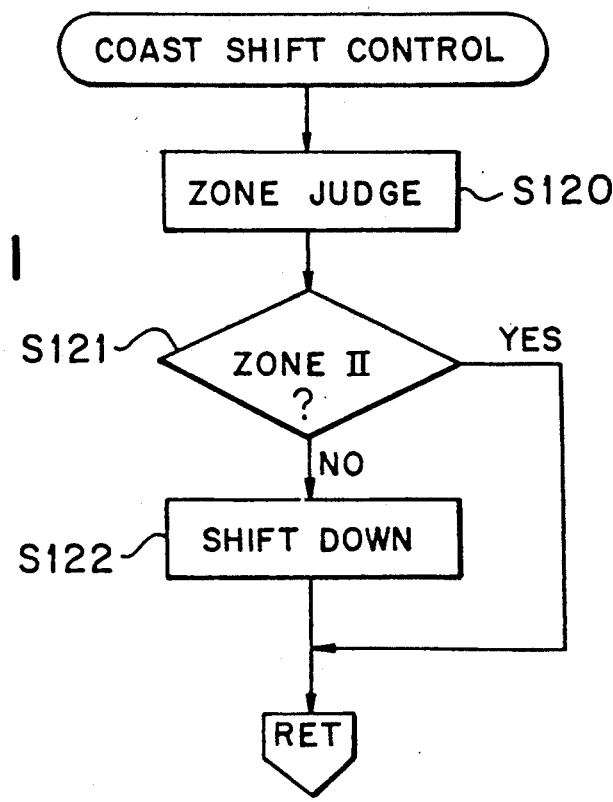
Figure 12:
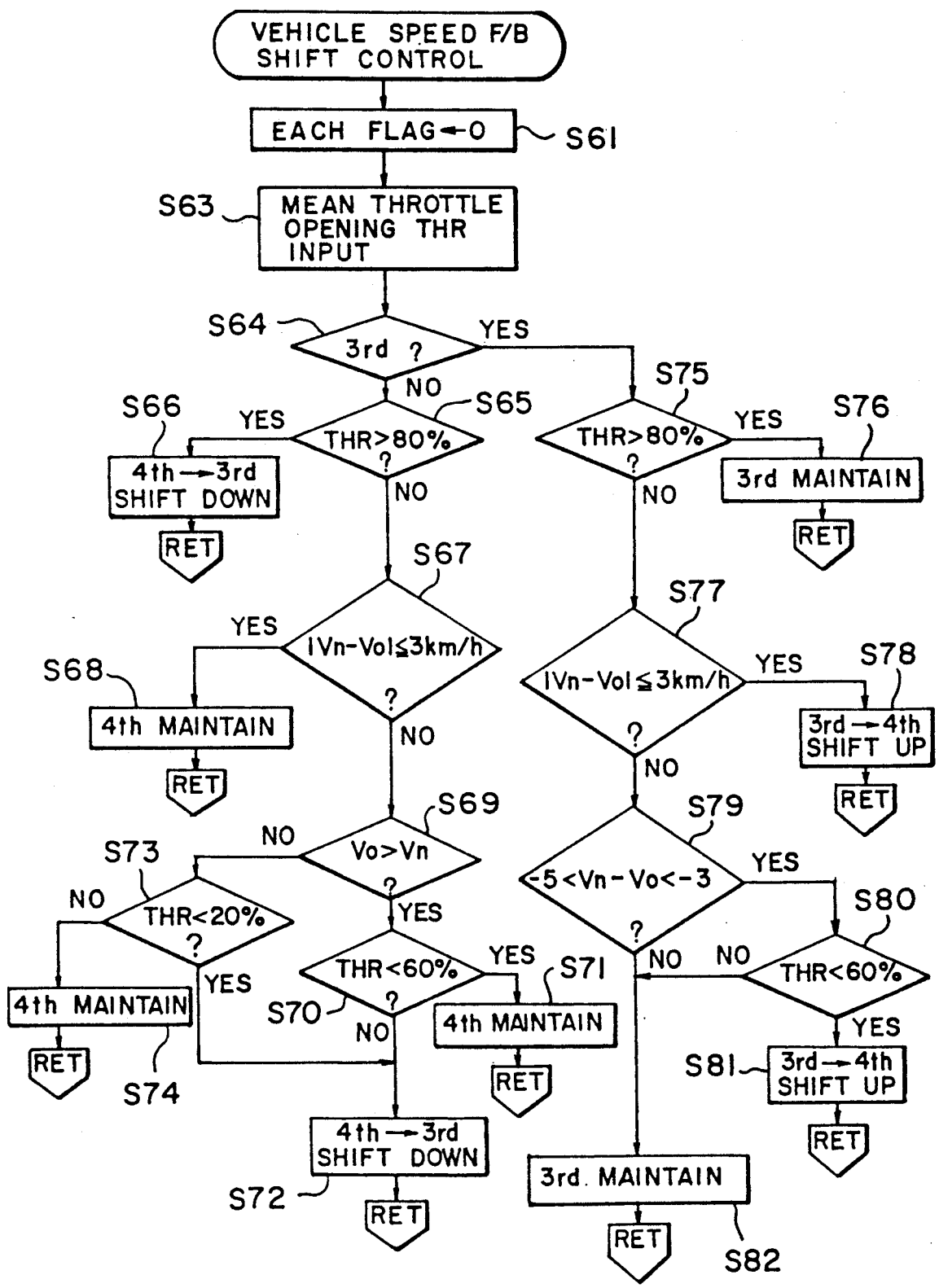

According to this embodiment, even when the set shift control or the coast shift control is terminated in the case of a shift down operation, the control unit 8 maintains the third gear position. Therefore, as shown in FIG. 12, which corresponds to FIG. 9 in the former embodiment, steps S60, S61, S62 in FIG. 9 are omitted therefrom. In connection with the above, a flow chart of the set shift control of the present embodiment shown in FIG. 10 is different from the corresponding flow chart shown in FIG. 5 for the former embodiment in that the step S103 in FIG. 5 is omitted. Likewise, FIG. 11, illustrating the coast shift control, is different from FIG. 8 of the former embodiment corresponding to FIG. 11, in that the step S123 is omitted.

It will be apparent from the foregoing that many modifications and variations may be made based on the above description by those skilled in the art without departing from the scope of the appended claims

We claim:

1. An automatic speed control system for a vehicle comprising:

an automatic transmission provided with a plurality of shift gear stages, speed change switch means, including a set switch and a coast switch, for producing signals for setting a target value of a vehicle speed, shift down control means for carrying out a shift down operation of the automatic transmission of the vehicle under a certain vehicle driving condition when the shift down control means receives the signals from the speed change switch means, gradient detecting means for detecting a gradient of a running path by determining when the vehicle is driven in an ascent running condition, a flat running condition, and a descent running condition, and shift down prohibiting means for prohibiting the shift down operation, even where the speed change switch means is actuated to reset the target value of the vehicle speed, when the coast switch is on and the vehicle is driven in said ascent running condition, and when the set switch is on and the vehicle is driven in said descent running condition.

2. An automatic speed control system in accordance with claim 1 wherein a shift up operation of the automatic transmission is suppressed when the gradient of the running path is greater than a predetermined value in the case where a shift down operation has been carried out in accordance with an actuation of the speed change switch means and thereafter the switch means has been turned off.

3. An automatic speed control system in accordance with claim 1 wherein the gradient of the running path is detected based on a map indicating a relationship between the vehicle speed and an engine load which varies depending on the gradient of the running path.

4. An automatic speed control system in accordance with claim 1 wherein acceleration switch means for producing signals for acceleration of a vehicle speed is provided as speed change switch means.

5. An automatic speed control system in accordance with claim 4 wherein a shift up operation of the automatic transmission is suppressed when the gradient of the running path is greater than a predetermined value in the case where a shift down operation has been carried out in accordance with an actuation of the acceleration switch means and thereafter the acceleration switch means has been turned off.

6. An automatic speed control system in accordance with claim 5 wherein the gradient of the running path is determined based on an engine load.

7. An automatic speed control system in accordance with claim 1 wherein deceleration switch means for producing signals for deceleration of a vehicle speed is provided as speed change switch means.

8. An automatic speed control system in accordance with claim 7 wherein a shift up operation of the automatic transmission is suppressed when an engine load is smaller than a predetermined value in the case where a shift down operation has been carried out in accordance with an actuation of the deceleration switch means and thereafter the deceleration switch means has been turned off.

9. An automatic speed control system in accordance with claim 8 wherein the gradient of the running path is determined based on an engine load.

* * * * *